US010863668B2

(12) United States Patent
Chrysanthakopoulos et al.

(10) Patent No.: US 10,863,668 B2
(45) Date of Patent: Dec. 15, 2020

(54) AUTONOMOUS MOBILE PLATFORM WITH HARVESTING SYSTEM AND PEST AND WEED SUPPRESSION SYSTEMS

(71) Applicants: Georgios Chrysanthakopoulos, Seattle, WA (US); Adlai Felser, Seattle, WA (US)

(72) Inventors: Georgios Chrysanthakopoulos, Seattle, WA (US); Adlai Felser, Seattle, WA (US)

(73) Assignee: DCENTRALIZED SYSTEMS, INC., Seattle, WA (US)

( * ) Notice: Subject to any disclaimer, the term of this patent is extended or adjusted under 35 U.S.C. 154(b) by 235 days.

(21) Appl. No.: 16/024,450

(22) Filed: Jun. 29, 2018

(65) Prior Publication Data

US 2019/0200519 A1    Jul. 4, 2019

Related U.S. Application Data

(60) Provisional application No. 62/612,297, filed on Dec. 29, 2017.

(51) Int. Cl.
*A01D 46/30* (2006.01)
*A01D 46/24* (2006.01)
(Continued)

(52) U.S. Cl.
CPC ........... *A01D 34/008* (2013.01); *A01M 21/04* (2013.01); *B25J 9/1697* (2013.01); *G05D 1/0219* (2013.01); *G05D 2201/0201* (2013.01)

(58) Field of Classification Search
CPC .. A01B 51/026; A01B 79/005; A01D 34/008; A01D 46/30; A01D 75/00; A01D 46/24;
(Continued)

(56) References Cited

U.S. PATENT DOCUMENTS 4,663,925 A * 5/1987 Terada ................... A01D 46/24
382/153
5,426,927 A * 6/1995 Wang ..................... A01D 46/24
56/328.1
(Continued)

OTHER PUBLICATIONS

Fundamentals of Weed Science, 4th edition, Robert L. Zimdahl, p. 308.
(Continued)

*Primary Examiner* — Robert E Pezzuto
(74) *Attorney, Agent, or Firm* — Tracy M Heims; Apex Juris, PLLC.

(57) ABSTRACT

This invention is a configurable ground utility robot GURU having at least the following parts: an all-terrain mobile apparatus; a payload accepting apparatus; an onboard processor; at least one sensor that communicates with said onboard processor; at least one energy beam payload device connectable to the payload accepting apparatus, capable of creating an energy beam having enough power to elevate an internal temperature of a subject when the energy beam is focused on the subject and where the energy beam payload device communicates with the onboard processor and where the ground utility robot also has a computer program that at least performs the following functions: receives and interprets data from the at least one sensor; controls the mobile apparatus; focuses the at least one energy beam on the subject; and controls the beam strength and time duration.

17 Claims, 10 Drawing Sheets

(51) Int. Cl.
*A01D 34/00* (2006.01)
*A01M 21/04* (2006.01)
*G05D 1/02* (2020.01)
*B25J 9/16* (2006.01)

(58) Field of Classification Search
CPC ...... A01M 21/04; B25J 9/0084; B25J 9/1612; B25J 9/1697; B25J 19/23; G05D 1/0219
USPC ................ 56/10.2 R, 10.2 A–10.2 H; 701/50
See application file for complete search history.

(56) References Cited

U.S. PATENT DOCUMENTS

| | | | |
|---|---|---|---|
| 5,442,552 A | 8/1995 | Slaughter et al. | |
| 5,544,474 A * | 8/1996 | Finkelstein | A01D 46/24 56/10.2 A |
| 7,854,108 B2 * | 12/2010 | Koselka | A01D 46/30 56/10.2 A |
| 8,381,501 B2 | 2/2013 | Koselka et al. | |
| 9,475,189 B2 * | 10/2016 | Kahani | B25J 19/023 |
| 10,011,352 B1 * | 7/2018 | Dahlstrom | B05B 13/005 |
| 10,555,460 B2 * | 2/2020 | Bhavani | A01D 46/24 |
| 2008/0010961 A1 * | 1/2008 | Gray | A01D 46/30 56/10.2 A |
| 2013/0345876 A1 | 12/2013 | Rudakevych | |

OTHER PUBLICATIONS https://en.wikipedia.org/wiki/Glyphosate.
http//www.bosch-presse.de/presseforum/details.htm?txtID=7361&tk_id=166.
http://www.lely.com/uploads/original/Turfcare_US/Files/WeederSpecSheet_FINAL.pdf.

* cited by examiner

AUTONOMOUS MOBILE PLATFORM WITH HARVESTING SYSTEM AND PEST AND WEED SUPPRESSION SYSTEMS

RELATED APPLICATION

This application claims the benefit of U.S. provisional patent application Ser. No. 62/612,297, filed 2017 Dec. 29 and entitled AUTONOMOUS MODULAR GROUND UTILITY ROBOT SYSTEM which is incorporated herein by reference.

FIELD OF THE INVENTION

The current invention relates to a robot system that can include an energy collection system, an energy supply docking system, autonomous cooperative robots, payloads or apparatus attachable to the autonomous robots to perform functions or tasks and a control company or means to oversee and control robot reservations, robot delivery, operation and retrieval, to control energy collection and dissemination, and general maintenance and control of the robot system. This invention also relates to a human assisted machine learning system whereby humans are used to help train the robots to learn or perform functions. Finally, it relates to using the robots as cooperative or collaborative units whereby the robots can be used in unison to perform tasks that an individual robot cannot perform; or to assist other robots when needed, such as when a robot gets stuck in a field and needs assistance with movement, or a task; or to take over when another robot runs out of charge or fails to perform for whatever reason.

The invention relates first to the field of autonomous, modular, ground utility robot units, or GURU, to perform tasks. Nothing currently exists that is truly similar to the embodiments disclosed herein. In one embodiment the GURU accepts attachments that perform tasks, such as snow removal. In another embodiment the GURU is capable of moving cargo around. In another embodiment the GURU accepts payloads, such as a focused energy apparatus attachment that utilizes focused energy beams or lenses to focus light to perform a variety of tasks, such as weed suppression and control, pest or insect control, crop harvesting, and predator control. In yet another embodiment the payload weed suppression attachment apparatus is a screw device that will eradicate or remove a weed. In all applications the systems preferably utilize clean sources of energy and the entire systems are made from recycled or easily recycled materials and parts.

The autonomous robot of the present invention relates to an autonomous, cooperative machine, in the form of a lightweight insectoid mobile robot, or in the form of a mobile wheeled robot, or any other type of mobile robot, that can be deployed in farms, fields or large open crop raising areas to control weeds, control pests, harvest crops, scare predators, monitor weather, monitor livestock health, monitor soil aerate soil, provide security, move "stuff" around, transport cargo, or any of a variety of chores and tasks assigned to the robots.

Further, it is an autonomous robot system comprising an autonomous robot, allocation software that will allow a user to log onto a platform and enter information so that the control company can compile the information and then allocate the robots to the job. Once the robots are delivered to the job the system further has software that will allow the robot to navigate in either a structured or unstructured environment where the robot can perform a variety of tasks. It is also possible that there will be a system that can collect energy and utilize the energy either to run the robots on the work site or to use the energy to power robots at other proximate sites. Finally, it is an autonomous robot system that has the control company or means to deliver the robots to their jobs, to maintain the robots while at the job, to collect data, to collect energy when a site is so configured, and to generally oversee, run and maintain the entire robot system operation.

BACKGROUND INFORMATION

There is a great need to have robots assist in our daily lives. As technology moves forward it is now envisionable that robots can and will perform many of the tasks and chores that we as humans routinely perform in our daily lives. Already used abundantly in manufacturing, the personal "bot" has not quite made it into our lives much past the Roomba® cleaner by iRobot®. There are multitudes of applications for a mobile robot, including but not limited to room vacuuming, snow removal, transporter, ground aeration, plant watering, feeding and fertilizing, crop monitoring, weed control, pest control—both large and small (eliminating small bugs, along with scaring off larger predators) corn de-tasseling, crop harvesting (which might include picking beans, berries, apples, pears, grapes, etc.), grounds security, weather reporting, livestock surveillance and monitoring (for example, if an animal in the pasture is sick or injured the bot could report back to the farmer that there is a problem), debris cleanup and removal and a variety of other tasks and chores now performed manually by humans. Thus, there is a great need to have bots assist us in our daily lives.

It is clear from research that there is a great need to reduce weeds in order to protect food crops because weeds reduce yields due to the fact that they steal water, nutrients, and sunlight from food crops. This represents a significant challenge to all growers. One source states, "Currently, weed control is ranked as the number one production cost by organic and many conventional growers" see *Fundamentals of Weed Science*, 4th edition, Robert L. Zimdahl, page 308 incorporated herein by this reference. Furthermore, the weed problem is worsening as weeds become resistant to common herbicides. See https://en.wikipedia.org/wiki/Glyphosate incorporated herein by this reference.

Mechanical eradication of weeds could solve or at least minimize the problem of herbicide resistance. Accordingly, this strategy has been pursued by many. See, for example, http://www.bosch-presse.de/presseforum/details.htm?txtID=7361&tk_id=166, incorporated herein by this reference. The challenges are constructing cost-effective implements able to discriminate between weeds and desired crops and to find solutions to efficiently and economically remove weeds. In addition, mechanical weeding disturbs the soil, drying it out and actually encouraging weed growth by stimulating the weed seed bank. Purely mechanical methods are available commercially (see, e.g. http://www.lely.com/uploads/original/Turfcare_US/Files/WeederSpecSheet_FINAL.pdf, incorporated herein by this reference) but are limited in scope. Vision-based methods have not yet proven commercially successful possibly because of the great similarity between weeds and crops during some parts of the growth cycle. See also U.S. Published Patent Application Serial No. 2013/0345876 and U.S. Pat. Nos. 5,442,552 and 8,381,501 all incorporated herein by this reference.

There is also a great need to reduce and control pests. Insects routinely feast on plants, endangering crops and costing billions annually. By some estimates insects cost the US alone around $120 billion annually. Many of these damages are caused by insects that are not native to the US, but rather those that come in through travelers. However, unless we cease travel or cease raising crops, insects will continue to be an issue.

Next, there is a great need to find ways to harvest crops. Although we have many crops that are harvested using large machinery, there still exists many industries where crops are harvested by hand, including tomatoes, lettuce and spinach, cherries, apples, peppers, almond trees, and many other fruits and nuts.

There is also a need to have robots perform daily tasks, such as moving items around a farm, delivering supplies to a farmer in the field, moving debris from one location to another using a "follow me" function. This "follow me" function is extremely useful and could assist farmers and home owners alike. A cumbersome task such as hauling a load of dirt from the front to the rear of a property could easily be performed by a bot having the "follow me" function programmed.

The robots could also perform other functions, such as providing security to farm lands through the use of sirens or other non-invasive, non-lethal means; preventing predators from attacking livestock using the same non-lethal means; monitoring the health of livestock through images and video; weather monitoring using onboard sensors; aerating soil by injecting prongs into the soil as the bots move about; and a variety of other chores and operations. Thus, the bot could become the modern-day work horse of the farm.

The foregoing discussion is intended only to illustrate various aspects of certain embodiments disclosed in the present disclosure and should not be taken as a disavowal of claim scope.

SUMMARY OF THE INVENTION

The present invention desires to provide a robotics solution to eradicating weeds, eliminating or minimizing pests, harvesting crops, moving cargo around, monitoring weather, monitoring animal health, aerating soil, providing security, and to performing a multitude of other tasks, jobs and functions as programmed, all using robots that are made from organic, recyclable, interchangeable parts such that if one bot fails it can easily be repaired using parts from spare bots or from new, interchangeable parts. Further, these robots will perform their tasks, and will either be powered using onboard solar power only or a combination of solar and battery power. If the system uses an onboard fuel cell or battery, then when onboard power runs low they will return to either a central or outpost recharging, refueling station. If no refueling post is available, the robots automatically conserve energy by entering a low power mode and wait for charging levels to increase (through solar charging for example). Ideally these robots will be either powered/repowered entirely using energy acquired from renewable energy such as solar, hydro, wind, methane or any other type of renewable energy resource. Finally, the entire system, while mostly operating autonomously and able to deal with partial failure, will be overseen and run by a control company that is specifically designed to allow customers to order robots, that will deliver, maintain, repair and collect robots when their tasks are complete and to assist users with the entire system.

An issue or possible problem with using a single robot to perform some of these functions is that some of the tasks require multiple robots. For example, when harvesting plants, it is difficult to have one robot both pick and carry the produce. It is better to have one robot perform the cutting function and another perform the carry function. In addition, there are times when a robot requires assistance. For example, if one robot does not have enough power to pull a load up a hill it could be possible for another robot to come and assist. These cooperative robots are also an important element of this invention.

To perform many of these tasks the robots need to be trained to do a specific task. Currently there does not exist a way to obtain or gather this large data set. Another aspect of this invention involves human assisted machine learning whereby humans assist the robots while they are learning the task. As multiple humans assist the data base is concurrently constructed and the bots are trained.

In addition to the need to have the bots there is also a need for a system to deploy, command, control and monitor the bots. This system starts with a customer ordering a bot or multiple bots to perform a certain function or functions, followed by a control company delivering the robots to the customer. Next, having the control company oversee, manage, repair, replace the robots while they are performing their functions or duties, and finally, having the control company retrieve the bots from the customer for delivery to the next job.

The bots are able to negotiate around rural terrain and using either mechanical or an energy beam control system mounted to the bot or to other mobile devices, can perform a variety of tasks. Specifically, to control weeds; to control pests; and to harvest crops. This application deals specifically with the weeding and pest control apparatus, its mechanical components, energy source and utilizing and controlling the apparatus. This application also deals with the deployment, autonomous navigation patterns and cooperative behavior of a multitude of robots that perform tasks independent of human involvement. And finally, this application deals with the control company and the means to manage the bots.

Figure 1:
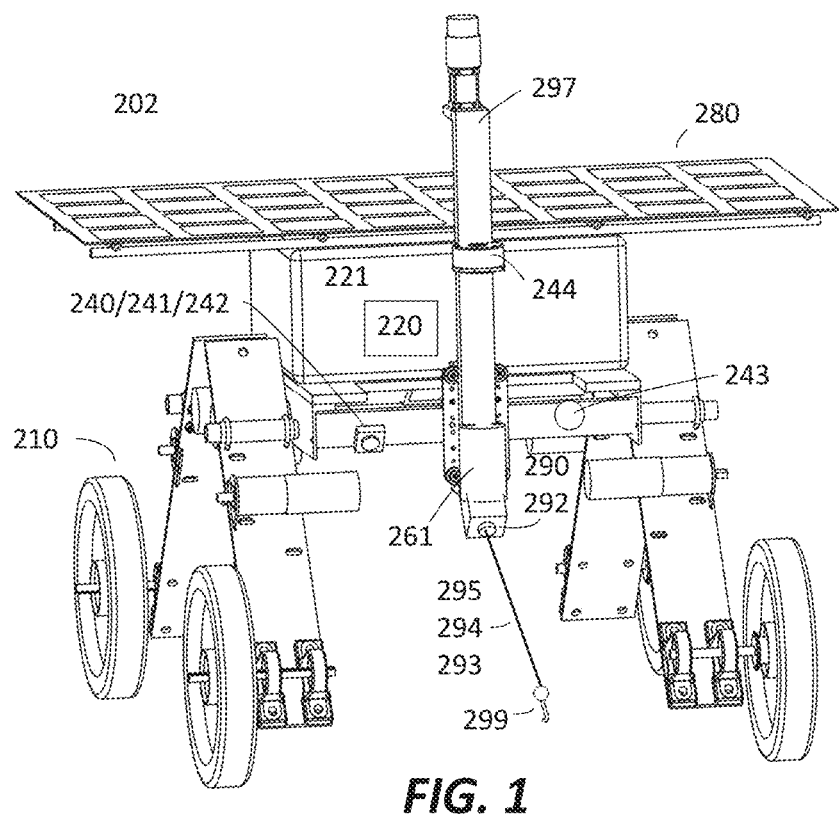
FIG. 1 is a perspective view of a GURU of the present invention.

The exemplifications set out herein illustrate various embodiments, in several forms, and such exemplifications are not to be construed as limiting the scope of the appended claims in any manner.

DETAILED DESCRIPTION OF THE INVENTION

The following detailed description teaches the now current preferred embodiments of the invention. However, it is noted that the claims and this invention are not limited by these descriptions. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and illustrative. Variations and changes thereto may be made without departing from the scope of the claims.

The terms "comprise" and any form of comprise, such as "comprises" and "comprising", "have" and any form of have, such as "has" and "having", "include" and any form of include, such as "includes" and "including" and "contain" and any form of contain, such as "contains" and "containing" are open-ended linking verbs. As a result, a system, device, or apparatus that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

ALLOCATION AND RESERVATION SYSTEM, DATA CONTROL SYSTEM AND METHOD USING A CONTROL COMPANY. In order to make all of the following described inventions work there needs to be a means, system or method to get the robots into the field and out to the customers. This will be described more fully below, but in general, the system includes an entire method and system to reserve bots, deploy bots, maintain bots and to retrieve bots. In addition, there is a system to collect, manage, sort, arrange, configure, utilize and store data. The reservation system is an entire method having the steps of having a customer either downloading a computer or mobile device application, or logging onto a reservations website, inputting data, a control company receiving the data, the control company analyzing the data, the control company utilizing the data and control company's own data collection to provide a service estimate to the customer based on the data analysis, control company compiling a second data set based on a second real-time data collection of weather and land for real-time analysis, providing a final estimate to the customer, customer accepts or rejects offer, if customer accepts estimate then control company deploys robots to the customer, unloads robots at customer's site, and robots begin completing assigned tasks. After the tasks are completed, the control company returns to the customer site and retrieves and removes robots from the site. The robots are then either returned to a storage facility or are moved to another customer's job site.

More specifically, the control company oversees and manages the robots for the customers i.e., the farmers or individual customers, so that the customers are not responsible for maintaining and servicing the robots. The control company will provide multiple services and these services can include but are not limited to: bot reservations, delivery of robots when needed, providing technical support when needed, providing mechanical support and repair services for robots when needed so that the robots are continually operational, attending to software updates, overseeing general maintenance, assisting with data analysis (this could include weather forecasting, forecasting how many robot units will be needed for the next growing season, if robots should remain on the property for continued weather monitoring, predator monitoring, etc.) retrieving robots when their mission and duties are complete, and possibly assisting with the energy needs of the consumer and the robots. In addition, the control company will collect, sort, organize, manage, utilize and store a multitude of data collected while the bots are on site performing their tasks. This data is utilized for future assignments to the same customer, and to help estimate and provide information to customers in the general vicinity.

All of the above referenced systems and apparatus rely on the control company. The control company starts with reservations and the reservations software. The reservation software is accessible by the customer so that the customer can reserve robots and schedule delivery. This is started by the customer inputting a customer identifier, specifying a location and date, and setting a timeline of what needs to be accomplished. This timeline will depend on the type of service required, such as weed suppression, de-tasseling corn, applying pesticide, applying fertilizer, pest control, or any of the number of chores or tasks required and that can be provided by the bots. The software system applies the collected data and combines reservations from a multitude of customers to minimize the transport of robots between set locations. Next, the software allocates the number of robots required at each location and schedules the bots based on the number of requests, the tasks requested, and the acreage or amount of land requiring service. The software also creates alerts of an event that is sent to an operator or an autonomous vehicle that loads the required number of robots at a specified date created from the information inputted by the customer.

Each reservation begins with the customer utilizing a scheduling wizard. The customer inputs a variety of data, such as parcel number, address, crops grown, tasks required, preferred access to the property with predefined ingress and egress, and any other data deemed necessary for proper task execution and entry and eventual bot removal. It is also possible to automatically use gps and other systems to map the property and fields and to come up with a schedule, boundaries and paths for the robots to follow. The software compiles all the data and information and creates a customer profile.

This same software enables the control company to create cost and time estimates for each schedule. After the scheduling there is an onboarding operation that takes place once a year. In order to arrive at a cost estimate the system takes a multitude of data into account, including but not limited to historical weather data for the service area. Next, the system considers any data provided by the farmer or customer. Also, the system considers past data and success rates moving forward. Looking at the past weather information, customer information and past customer work data is helpful to obtain the best time to perform the desired tasks. Combining all of this information and whatever other data can be compiled the system generates a cost based on the number of bots required and the time allocation for the desired work performed and is delivered to the customer prior to final scheduling. At this time the customer can input his payment information and secure the reservation for robot delivery.

When the time comes for the robot delivery the system again analyzes the weather conditions, this time in real time, to compare with the prior data generated estimates and calculates a better, real time estimate of time and robots required to perform the tasks. At this point the system generates an estimate of renewable energy, typically solar, for the duration of the task. This second notification is sent to the customer for a real time estimate of energy required for completion. This is important as if, for example, the prior estimate was based on sunshine every day, but at the time of actual work there are clouds, storms and inclement weather. This affects the energy collection and possibly the time required for the job's completion.

After the customer confirms scheduling and delivery date the robots are set for delivery. At this time an alert or notification is again sent to the customer indicating arrival time. Another alert is sent to either a human operator or an autonomous vehicle that it is time to deliver the bots. The bots are collected from a main storage area where they are kept for storage, repair, charging, maintenance and upgrades, or they are collected and delivered from a nearer location where they were previously deployed, such as a neighboring farm. Once they arrive at the designated work area, or field, they exit the delivery vehicle and are sent to the field, thus entering the on-field operation stage. The bots then use the pre-assigned entrance routes collected from the customer to navigate to and through the field and to their assigned work areas. Then, an operator or software, confirms robot location through visual or gps data. The robot, because of built-in software, also knows it is where it is supposed to be. At this point the bot and the software shake hands to confirm that the bot is in the appropriate location to perform the tasks and the bots are then placed in autonomous mode, either by the local operator or automatically via the software. They go to work and operate continuously until their tasks are completed. The only restriction or limitation is their battery capacity and available solar energy collectable at the time of operation.

Once on the field and running the bots continue to communicate with each other. If cloud connectivity is available, then they post real time data to the cloud. This is not a requirement however as they can always connect up later and upload data at a later time. The software systems running within each robot performs real time updates with the other robots that are part of the same communication group using a local wi-fi hotspot, provided by consumer grade cell phones. The robots form an ad-hoc communication mesh network so that they can communicate with each other and so they can monitor each other's progress and health. Through this system they know if there are any issues with other bots or anomalies in the system.

If an error, anomaly, bot health or other problem is detected then the bots perform a variety of response actions. Typically, a problem would require one bot go and assist the failed bot. In order for the bots to decide which one should go they will perform one of several actions. A first way to decide which bot should go and assist is to perform an election. In this scenario the able-bodied bots share and compare information, such as their location and proximity to the downed bot, the ease of access to the downed bot, or any other information that allows the bots to choose which bot should lend assistance.

Alternatively, the bots can perform a random drawing to see which bot takes over the task of the failed bot. This choice may however cause one of the most inaccessible bots to have to come a long distance to help out.

These options allow one or more bots to lend assistance. If a disabled bot is down, not because of a failed battery or software issue, but is simply stuck, then other bots could come to the rescue by pulling, pushing or attempting to free it from its "stuck" situation. If assistance is futile and the bot remains stuck then one or more of the bots could send a distress signal to the human operator or to the operating software to notify a human operator of the situation so that sufficient resources, such as a human assistant, can be sent to find, retrieve and repair the downed bot.

Similar to the assistance lent to downed bots, the bots can communicate with each other and lend assistance if one bot is behind with its' assigned task. Once a bot completes its' assigned task it communicates with the other bots to find out if there is another bot in need of assistance. If help is required, the "work completed" bot goes to the work area occupied by the slower bot and assists until the task is completed.

Finally, after all of the tasks and chores are completed, the bots are retrieved from the workplace. This is called the collection stage. When the bots have entirely completed the assigned work, they communicate with each other confirming completion, they then use the predetermined egress paths to exit the workplace and to go to the collection zone. Once assembled they are loaded using a variety of navigation options that are similar to the loading options. A first method of loading is autonomous where the bots drive themselves into the collection vehicle. Another method is assisted navigation whereby an operator "drives" the bots with a controller of some sort. In this way the operator helps the bots avoid obstacles and assists them into the transport. Finally, they could use a semi-autonomous system where it is a mixture of manual, mixed manual (for example, to avoid a wall), autonomous, or path planning. Any combination of navigation is possible. Using one of these three preferred systems the bots wait for the human operator or autonomous vehicle to arrive and signals them to load in a sequential fashion into a transport vehicle, whereafter they are taken directly to the next work field or station or are returned to the bot storage facility for repair or maintenance.

The above reservation system is the starting point for the customer use of the outdoor utility and agricultural task system using lightweight self-charging robots. Next, the actual robots and robot system is described.

Robot System.

Figure 6:
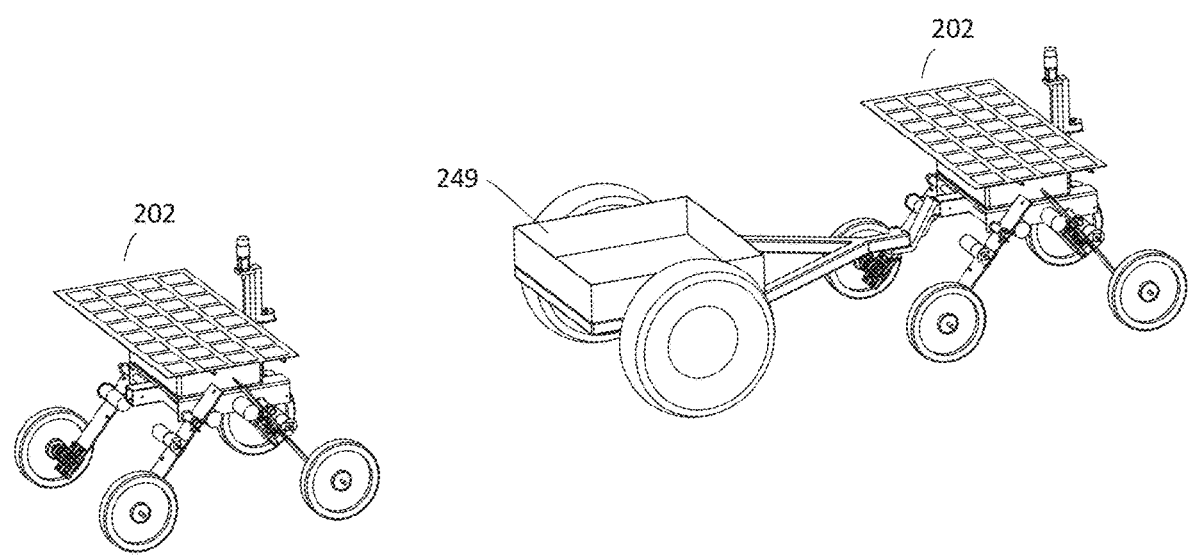
FIG. 6 is a perspective view of the GURU with a trailer hitch attachment and another GURU performing a follow me function.

In all of the preferred embodiment there is an autonomous robot system 1 that at its core has an autonomous ground utility robot unit, or GURU 2, as shown in FIG. 1. This system includes at least the above described reservations system and at least one GURU 2. This system also includes a computer program 20 that allows the GURU 2 to navigate in either a structured or unstructured environments of varying terrain. The GURU 2 of this system, more clearly defined below, has at least a chassis 11, onboard sensors 40, a mobility apparatus 10, payloads 62, and/or attachments 19. The attachments 19 can be any of a variety of attachments 19. Some are designed for snow removal or for moving dirt and debris. Some could also be a trailer or some other apparatus to pull behind the GURU 2 and are connected to a trailer hitch 18, as shown in FIG. 6. In addition to the attachments 19 the GURU 2 may have a payload receiving system 60. The payload systems include a payload receiving apparatus 61 and a payload 62. The payloads 62 are designed to perform a variety of tasks. Some are designed to suppress weeds, others are designed to control pests, other for harvesting crops but all are designed to be received into the payload receiving apparatus 61. By way of example the payload could be an energy beam control system 63, designed to suppress weeds or pests with an energy beam. To perform these tasks the GURU 2 utilizes at least one onboard sensor 40 that is controlled by the onboard software 20 and onboard electronics 50 stored in an electronics enclosure 51. In addition, the system may have a fueling port 3 with fueling connectors 4 incorporated into the GURU 2. The fueling port 3 may also have a backup refueling port battery 5. In order to power the mobility apparatus 10 there is a rechargeable battery 30 powered by a solar array 80 on the GURU 2. It may be also possible for the GURU 2 to recharge at a fueling port 3 and it may also be possible to recharge at the fueling port 3 via an inductive charging port 70 through inductive charging plates 71 located on a bottom of the GURU 2.

Cooperative Robots.

The GURU 2 can also act as cooperative robot, working with an in conjunction with another GURU 2. When the GURUs 2 act as cooperative robots, they have the ability to interconnect with other GURUs. This cooperative functioning has several advantages. First, connecting to other GURUs provides more moving power to the first GURU 2 or allows one GURU 2 to move, assist or relocate a disabled GURU 2. Next, the robots communicate with each other and if one GURU fails or becomes disabled or stuck, then it will communicate its predicament or problem to the other available GURUs 2. They will then select the closest GURU 2 to come and assist the disabled or needing robot. This might mean that the assisting GURU 2 may take over the function or task of the original GURU 2. Or, it may mean that the assisting GURU 2 comes and provides additional power or resources to perform a function, such as pushing or pulling a stuck GURU 2 or providing additional power to move a load or even to help the first GURU catch up with the work assignment. This ability to link together allows the GURUs 2 to work as a team. Using an autonomous navigation systems to locate each other they can form a train, attaching securely front to back, using an electromechanical mechanism, or electromagnetic latch. This allows 3 robots the ability to pull nearly 3× the load over what a single GURU 2 can pull.

Human Assisted Machine Learning.

Figure 7:
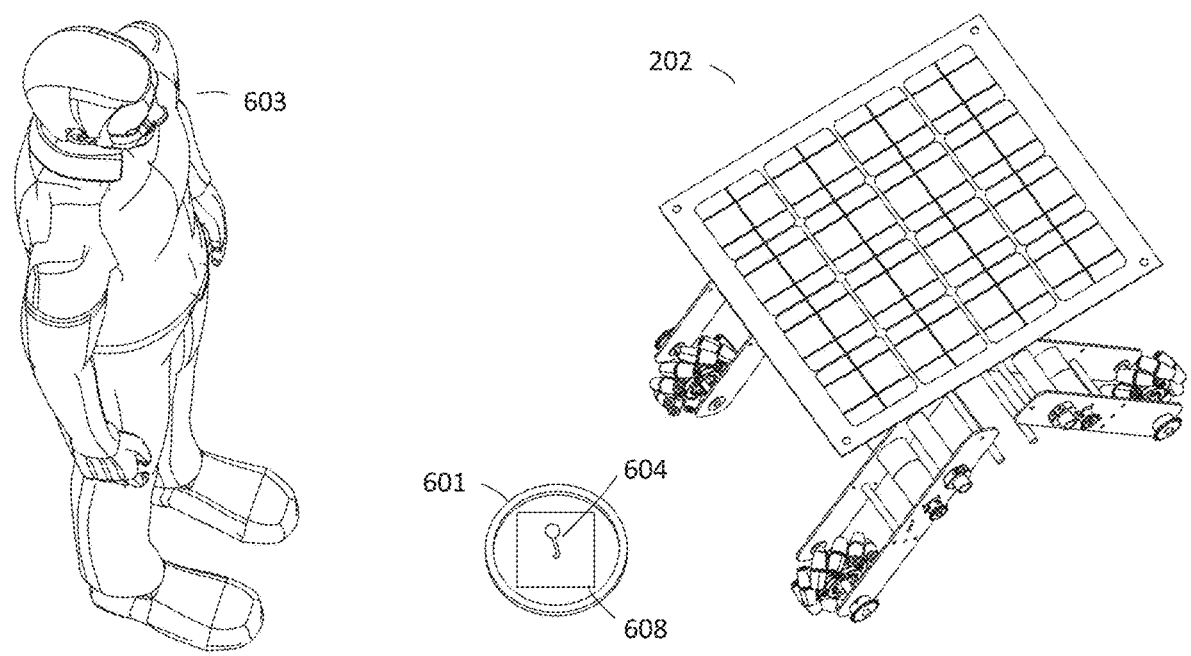
FIG. 7 is perspective view of the GURU with an object, physical marker and a human, showing the human assisted machine learning system.
Figure 10:
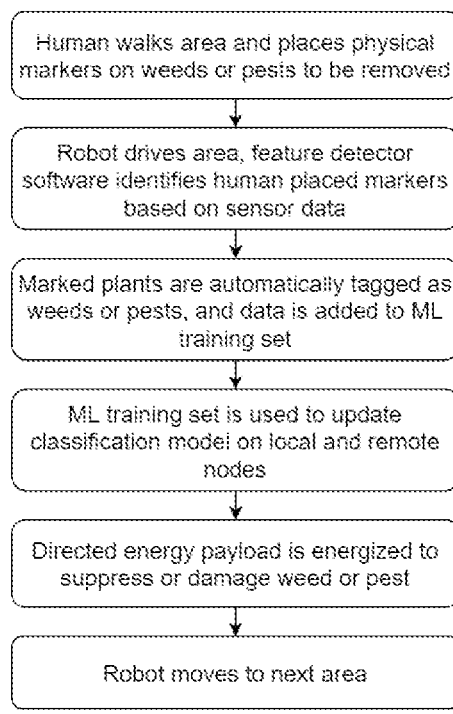
FIG. 10 is flow chart showing the steps performed for human assisted machine learning.

As shown in FIG. 7, another unique aspect of the present invention is a method of human assisted machine learning. This will be defined more fully later, but in general, the system includes having a human 603 deploy a marker 601 over an subject 604 to be identified, having the GURU 2 locate the marker 601, identify the subject 604 and then enter the information into a data bank. FIG. 10 is a flowchart defining and setting out the procedures and steps followed to complete the process.

GURU.

To more clearly and specifically define the invention the figures and specifics of the invention will now be described. FIG. 1 shows a first embodiment of a Ground Utility Robot Unit, or GURU 102. The work horse of the robot system 1 is the Ground Utility Robot Unit, or GURU 102. One preferred design for the Ground utility robot 102 consists of: a rectangular metal/wood chassis 111 having at least one and preferably two identical motors 112 placed on opposing sides of the chassis 111; a mobility apparatus 110, preferably a caterpillar track system having sprockets 113 and chains 114 attached to the motors 112; tracks 115 around the sprockets 113 (similar to earth moving vehicle or caterpillar); onboard sensors 140 and onboard electronics 150 that provide autonomous and remote-control navigation; onboard software 120 and computer processor 121, an onboard solar array 180 and an onboard fuel cell 130; a trailer hitch 118 and a payload receiving system 160.

It is to be understood that these specifics are not limiting and that the GURU 102 could use other similar parts to accomplish the same end result. It is also to be understood that not all of the above referenced parts are required for operation and that removal of some will not destroy the usability of the GURU 102. For example, the motors 112 are preferably 2 HP electric motors but they could be different sized motors. Ideally the motors 112 will be powered by solar arrays 180, such as a 200 W solar array or smaller arrays, such as the 2 W arrays. They could alternatively be powered by other means, such as propane, methane, gasoline, diesel or another alternative energy source. The GURUs 102 could also run on a combination of fuel or energy sources. The means to power the GURU 102 is only limited by the existing technology.

The chassis 111, as shown in FIG. 1, is preferably manufactured from recycled materials or easily recycled materials that are environmentally friendly. However, any material could be utilized to create the chassis 111, such as metal, plastics, carbon, graphite, bamboo, rubber or any other material that will accomplish chassis construction. The chassis 111 could be a combination of materials. The chassis 111 as shown in FIG. 1 will also have an 18-inch ground clearance, but again it could be any clearance as long as the robot is able to accomplish its tasks. The chassis 111 must also be capable of side to side and up and down movement in order to position certain payloads 162, such as an energy beam control system payload 163, so it could have a linkage chassis 116 to allow for movement, along with a pivoted suspension system 117. It could also have the trailer hitch 118, either standard or custom, for securing and pulling accessories, such as a trailer, or to link together with other GURU 102 to utilize the cooperative GURU function as described above.

The mobility apparatus 110 could have a caterpillar track system 115 having tracks that rotate around wheels; however, any type of apparatus or system that allows the GURU 102 to move about varied terrain is acceptable. FIG. 1 shows that this mobility apparatus 110 could include any type of wheels, including: inflated or hard rubber, flat free tires 123, as shown in FIG. 1, or other material. Another variation could be any rotational wheel type apparatus with prongs to aerate the soil or virtually any other rotational apparatus to move the GURU 102 around. Obviously, the easiest and most accessible apparatus would be wheels of some sort, but it should be understood that other means may be used.

In yet another embodiment the mobility apparatus 110 could be a multi legged configuration similar to hexapod robots. In this embodiment the GURU 102 is moved around by legs 122 and the GURU 102 is an insectoid device 124 having the legs 122 that navigate and move the device around. In addition, the legs 122 would allow the GURU 102 to climb steps or navigate rocks or other obstacles that a wheeled device could not get around. The legs 122 would also allow the device to infinitely adjust the chassis position. And although it may be more difficult to program and control it would make the GURU lighter as there would no longer be the need to have a complicated pivoted suspension 117 system or the linkage chassis 116. The legs 122 would simply align the energy payload rather than the pivoted suspension 117 and linkage chassis 116.

These bots, for all their simplicity, have sophisticated electronics and thus the bots are weatherproof and have parts that are waterproof, such as an electronics enclosure 151 that is weatherproof as it contains the electronics 150, batteries and sensitive components. This is essential for the desired continual 24/7 duty cycle expected of the unit. It is also essential to preserve recorded data and to ensure that the bot is operational at all times. The bots ideally have a variety of sensors 140 and the electronics 150 included, among other things, allow the bots to be Wi-Fi hot spots so that no internet connection is required. The bots are autonomous. They have distance ranging sensors (as in an ultrasonic sonar 149, laser range finder, or LIDAR 44, and continual programming throughout the day and night to assist the bots with obstacle avoidance, no matter the time of day or what the weather conditions. They have motion sensors 143, such as cameras 141 for motion sensing, real time viewing, telemetry and for debugging. Ideally, they will have at least one and preferably two or more cameras 141 for depth of field vision and to cover more area and to collect more data. They could have infrared cameras 142 as well so they can have night vision. They should have microphones 145 to record data and to hear things, such as predators or invaders. They might have LED high powered flash lights 147 or other lighting to assist with video, image capture, or to act as a deterrent and to scare off predators, invaders, thieves, etc. They could also have an audible device 146 such as sirens, bells or whistles, again to send warnings, alert the customer, or to deter predators and thieves. They will have a GPS system 148 to assist in their mobility and location. Finally, they may be able to sense air and soil conditions through a variety of ground and air sensors so that the GURU is able to record and store temperature, humidity, altitude, wind speed, velocity and direction and any other parameters set out by the customer.

Ideally the GURU 102 is indestructible, but obviously that is virtually impossible. So, as an alternative, the GURU 102 will at least have the following characteristics. The bot is light and easy to move around. This is so it can easily be loaded and unloaded at jobs and is easy to move around for repair. The bot is resistant to wear and tear through vibration and abuse in the field and is able to operate in all temperatures and in all weather conditions. Constantly moving through fields, even at a slow pace, takes a toll on the bot, so it must be able to withstand the abuse, as the bot should last at least 5 years. It is modular so that if a part fails it can be quickly and easily replaced with a duplicate part. This modularity is also part of the plan to have multiple robots in the field and on site at one time. Thus, if one bot fails it is easy to borrow a part from a stagnant bot for replacement, at least until replacement parts are delivered to the site. As the bots are all the same it is possible to interchange parts quickly and easily. Thus, it is clear that there are a number of variations to the preferred embodiments and so these embodiments are not meant to limit the invention.

The GURU 102 runs entirely on solar power in the preferred embodiment. However, there may also be an onboard fuel cell 130 to compliment and support the onboard solar array 180. If an onboard fuel cell 130 is included, then the onboard fuel cell 130 will recharge itself mainly using the onboard solar array 180 but if needed the system may include refueling at a fueling docking port 103. This docking port 103 could be connected to the grid but could also have a large capacity fueling port battery 105 along with its own on-site solar array 181 so that the battery 105 can be recharged using only the on-site solar array 181. In addition to or in place of the on-site solar array 181 the system could be powered by other alternative fuels. These alternative fuel sources could include but are not limited to methane, hydro, latent ground heat, thermal or wind and fuel cells.

The GURU 102 will automatically know when it needs to recharge based on programming that takes into account data including but not limited to its current charge level, its distance from the fueling port 103, and the amount of time and obstacles required to pass to return to the fueling port 103. Once this is calculated the GURU 102 will self-navigate and return to the refueling fueling port 103 to automatically refuel. Once at the fueling port 103 the GURU 102 will recharge either by docking into a fixed port via the fueling port connectors 104 on the GURU 102 or by utilizing an inductive charging port 170 using a charging plate 171 on a bottom of the GURU 102.

It is also important that these GURU 102 have the ability to navigate in both structured and unstructured environments. A general aspect shared between all GURU 102 is autonomous navigation in an unstructured, dynamic environment, with or without the use of GPS. The GURU 102 are taught a logical "graph" of the locations and paths between them, then use that pre-learned topological graph to navigate, using real time localization from all available sensors. Also, the GURU 102 can operate in a geo fenced area or a learned route (visual learning or using a set of GPS coordinates) that will teach the GURU 102 so that it can avoid any obstacles by either stopping or taking evasive action. Onboard sensors 140, such as cameras, provide data for autonomous navigation and for remote telemetry/capture/real time monitoring. The GURU will use a navigation pattern suitable to the terrain and task: in a flat, unstructured hay farm, or grass lawn, the GURU will use a spiral pattern, picking a center then starting on the perimeter of the geo-fenced area, and decrease the radius as it rotates around the "virtual center" of the task area. This minimizes abrupt turns, saving energy, and allows the GURU to exit, from the center of the area using a direct path to the exit point. The spiral pattern is achieved by moving the virtual GPS markers closer to the center, after each rotation, forcing the GURU to navigate an increasingly smaller area, again in a circular pattern.

The GURU 102 also features artificial intelligence with an ability to learn as it works. One way to teach the GURU 102 navigational skills is through training. In this scenario a user uses a training procedure whereby the GURU 102 is moved around a specified area. For example, it could use a two-node training system where the user assigns a point A and a point B and where the GURU 102 then navigates between points A and B. While navigating between these two points the GURU 102 will collect data and information using the onboard sensors 140, such as location sensors (GPS), inertial sensors, magnetic field sensors, microphones and cameras, and will apply this collected data to learn from this information.

Alternatively, the GURU 102 could be trained using geofencing and virtual GPS markers. In this scenario the user supplies a predefined graphical area in which the GURU 102 is allowed to roam. This area can be created from GPS coordinates, for example or even from Google® maps. The area is defined using virtual coordinate markers, which appear as obstacles in a 360-degree obstacle profile. The virtual obstacles and the real obstacles (detected through onboard sensors such as LiDAR, sonar, infrared emitters) are fused into a single obstacle depth profile, used by an autonomous navigation software. Once this area is defined by the user the GURU 102 is allowed to freely roam around the predefined area. As it roams this area it again will use onboard sensors 140, microphones, cameras, etc. to collect data from which it will learn.

The bats can perform a variety of tasks and will be extremely useful to the consumer, customer or user. It is envisioned that the bots be affordable, resilient, low maintenance, autonomous and environmentally friendly. Specifically, it is envisioned that the bots cost approximately $5,000 or less. That they have a duty cycle duration of approximately in 75% active and 25% low power mode, with the ability to charge while performing a task (through solar). Minimum runtime is expected to be 6 hours. As low maintenance devices it is contemplated that they will only require maintenance or service less than once a year (for repair or replacement parts). The fuel source should be environmentally friendly and preferably off the grid. To that end electricity will come from solar or grid tied base (docking) station, docking port 103, which could also have the large battery pack 105 that is solar powered via the on-site solar array 181. Alternatively, the methane system could be used where the methane is collected from the user's livestock, stored and distributed to the user and other users in the near vicinity. The refueling for the bots will take place at the autonomous docking port 103 whereby the bots automatically returns to the docking port 103 when it is in need of refueling. And finally, the hot system has a limited environmental footprint. As such it is envisioned that more than 90% of the materials used for the bats will be from recycled materials plus renewable materials by weight. This will create a net negative climate warming print through the removal of potent greenhouse gases.

Software.

The above robots all have an extremely intelligent software system built into them and into the control company and this software is also an integral part of the invention. The platform is also quite sophisticated. It includes self-update capability (self-update task service), secure (simple RBAC AuthZ model: admin, automation, local user), telemetry to cloud, (if Internet access is available), local persistence of configuration and sensor data and actuator commands. It also features great autonomy. Some of the features include: localization using depth profile, GPS, Wi-Fi signal strengths; navigation using topological path planner (which relies on localization); real time obstacle avoidance with signal conditioned input from 2D LiDAR, sonar, vision; IMU inertial drive controller (tilt, collision); feature detector, feature matcher services; IMU, temperature, etc. sensor services; and weed and pest classification using machine learning algorithms. The software covers not only the entire reservation system as described above, but also systems that provide: obstacle avoidance, autonomous docking, autonomous refueling that includes locating the docking port 103 when fuel is low and connecting with the fuel source while docking (either through a plug in attachment or through inductive charging system, user guided topological learning tasks, that is, learning the logical graph of locations where the GURU 102 will operate, virtual GPS markers restricting movement in a pre-defined area marking obstacles or hazards to navigation, autonomous or semi-autonomous navigation using a learned topology map or global positioning coordinates, telemetry publish to stream ingestion compute nodes (in remote data centers, and to local peer robots), update of learned tasks from offline training, downloaded/synchronized from remote nodes, fleet management code and self-update of all code and configuration (part of common control company software platform), anomaly detection and peer monitoring software that enables robots to take over tasks for a robot that has failed performing its task, within predefined time and space parameters, and leader election software algorithm that enables one healthy robot, from a deployed group, to take over the task for a failed robot.

Human Assisted Machine Learning and Real Time Subject Identification.

In addition to the reservation software, the operational software and the bot apparatus, there must be an efficient method or means to train the bots. Thus, this invention also teaches a human assisted machine learning and real time subject identification system, as shown in FIG. 7 and FIG. 10 flowchart. This system is based on a computer vision algorithm that processes camera images and identifies particular physical subjects of a specific color and pattern on their surface, such as weeds/non-weeds. This machine learning uses human assistance to facilitate learning. The system is relatively simple, but is quite unique. To start, a human 603 will take a physical marker 601 and places it over a subject 604. Ideally the marker 601 is an open ring, an open box, or any other configuration that has an open center and creates a perimeter around the subject 604. The human 603 will take the marker 601 ring and place it around the subject 604 to be identified. Once the physical marker 601 is placed on or around the subject 604 the onboard camera 605 captures an image or images 606 of the subject 604 to be identified. Next, the robot software system/onboard software system, uses image processing through a programmed image processing algorithm 607, to detect the subject's visual signature 608 in real time images. If the physical marker 601 is identified in the current marker image 606, then the enclosed image area is cropped, edited, labeled and stored as a separate, final image 609 for future machine learning training tasks.

This system works to very quickly advance the machine learning in the beginning by utilizing large numbers of humans to assist with the identification process. For example, each customer could be given some sort of incentive to assist in the program. After accepting the incentive, each customer would be responsible for placing maybe 500 markers on weeds. As an example, if the system rolls out and has 500 customers and all customers agree to participate in the incentive program, and if all complete the incentive program, then the customers would input 250,000 pieces of data in the form of camera images 606.

This system is also designed for the GURU to work as it is taught. For example, if a marker is identified by the bot then the task assigned is also performed. So, if the task is weed suppression, and the attached physical payload on the bot is a laser the non-plant/weed is identified, and the laser is turned on and aimed at the center of the marker image region. Prior calibration allows the robot to determine the relationship between the image location and the corresponding physical location to those image pixels. Once aligned the robot performs the weed suppression action (described below) and moves on to the next marker.

The GURUs can be used for a variety of work. Their applicability and usability are virtually endless. A few examples include snow removal, dirt removal, grading, mowing, trimming, weed suppression, pest control and suppression, harvesting crops, perimeter security, weather reporting, ground/earth testing and reporting, animal surveillance and health reporting, keeping stray animal and predators away from local livestock and off the property, security services such as reporting intruders and trespassers, use of non-lethal means to repel intruders, follow along functions, debris removal and cargo movement, ground aeration, and any of a variety of other chores and duties.

Below are some more detailed explanations of some of the uses and embodiments of the present autonomous robot system.

Snow Removal

A first application or embodiment utilizing the GURU 502, shown in Fig. ??? is a snow removal apparatus 500 that is added to the GURU 502. As noted, there are few robot applications for the typical consumer, but this is, or could be, a consumer-focused product. Thus, the target customers for this embodiment are consumers that spend significant time managing snow during the winter months. This is the vision of this embodiment; however, these bots could be used in larger format in rural areas to clear roads and highways, particularly at night when traffic is at a minimum. But for this application in particular, rural residents with drive ways, who currently use manually operated, fossil fuel powered machines, could utilize the bats for continual snow removal. Currently the technology exists to have the robots be responsive up to 0.5 miles, but with time this limitation will be removed, and the robots will have a much greater range.

In this embodiment the GURU 502 uses a snow removal attachment apparatus 503 that removes snow by slowly pushing the snow using a blade 510 or other pushing apparatus of some sort. This snow blade 510 can be a typical, off the shelf blade as the GURU 502 can be configured to accept this type of attachment. Alternatively, the blade could be a custom blade 506 designed specifically for use with the GURU 502 and that more efficiently removes snow. When specifically designed, this pushing apparatus has, in addition to the blade, an orifice 520 or opening for receiving snow. The blade 506 can be designed so that the collected snow is slowly funneled back into the orifice 520 through a snow funnel channel 531 as the GURU 502 slowly moves along its snow removal route. Once the snow is collected by the blade 506 it is then ingested into the orifice 520. Behind the orifice 520 is a melting area 540. In this melting area 540 the snow contacts a heating element 550. This heating element 550 is heated using excess heat from an onboard fuel cell 540 or by some other means of creating heat. Once the snow contacts this heating element 550 it melts, and the resultant water is then ejected and is dispersed in a predefined direction using a spraying apparatus 570. This removes the snow from the route and places the resultant water away from the cleared path. This entire snow removal apparatus can be connected as a singular unit to the GURU 502 or it could be integrated with the device itself.

A key part of this invention using the snow removal apparatus 500 is the use of the on-board fuel cell 530, to both power the GURU 502 and ingest and melt snow, as described above, while moving autonomously, on a 24/7 duty cycle. In this embodiment the GURU 502 with the snow melting capability operates continuously and self-charges, and instead of pilling the snow on the sides of the access roads, it sprays melt water in pre-programmed directions. A pump 551 takes the melt water and sprays it away from the snow removal GURU 502. The melt water is directed away from the surface being cleared, a minimum of 10 feet from the GURU 502, towards a direction specified by the user. This massively simplifies the task of snow management, because snow placement is a large issue. By converting the snow to water, it removes the need for heavy plows, augers, or other moving parts that get stuck or frozen shut. In this embodiment a snow removal gear 560 filters and melts the snow using the excess heat from the fuel cell 530 reaction.

In one embodiment this snow removal apparatus is methane fueled. In this embodiment there is a methane fuel cell 590 and a custom designed methane snow blade 597 with a grid of pipes 591 that circulates hot water 592 (over 400 degrees Fahrenheit) through the pipes 591. There is also a water collection basin 593 located near the rear side of the methane snow blade 597 that collects and melts snow using excess heat from the methane fuel cell 590. Finally, there is a system of methane spray pipes 598 and methane spray pumps 599 that spray away excess melted snow water from the GURU 502 and its path.

There can also be a battery powered variant of the snow removal device that includes all of the above features from the methane version but instead of using methane as fuel it uses a battery 581. The battery version also features an inductive charger plate 582 on an underside of GURU 502, so that the bot can charge wirelessly via inductive charging.

The goal for autonomous snow removal is to prevent snow accumulation on roadways without human intervention. An autonomous snow removal GURU 502 continuously removes snow when it detects snow fall. Obviously, snowfall can be detected using one or more of the onboard sensors, such as the camera or maybe a moisture sensor that senses snowflakes. The GURU 502 is ideally battery powered and self-charges using solar power from either the onboard solar array 580, or magnetic inductive charging via the inductive charger plate 582 at the base station system inductive charging port 583, or with the base station or fueling port 503. Ideally the autonomous robot system also has a separate solar array 581 located at the fueling port 503 that continually charges the system recharging battery 505.

Follow Me Bots

Another use for the Robot system is that of cargo transportation through a "follow me" function. The same GURU, in all seasons, can perform a "follow me" function, pulling a trailer so the human owner can have the GURU follow them around, place subjects (produce, weeds, logs, heavy items) in the trailer, then instruct the GURU to "go to" a pre-learned destination. This trailer ideally is designed to work specifically with the bot but could also be a general trailer that is configured to work with the GURU or where the GURU is configured to work with the trailer.

A key part of this embodiment is that the GURU will not only follow the user, using machine vision, and/or wireless beacons, but will also autonomously navigate to pre-learned locations and "dump" the items, then return to the owner.

Weed Bots

Figure 9:
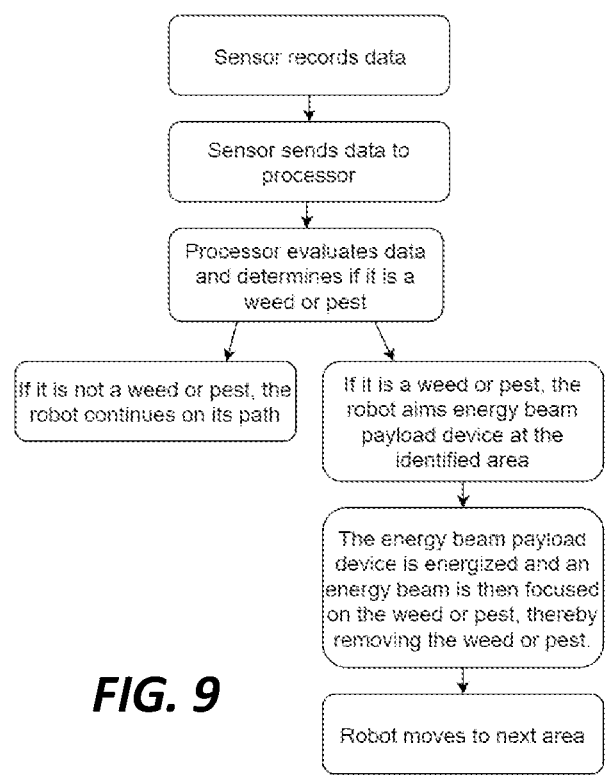
FIG. 9 is flow chart showing the operational steps taken to eliminate weeds or pests.

The next three embodiments of this invention involve means, apparatus and systems to control weeds, to control pests and to harvest crops. The process is shown in FIG. 9. All three embodiments utilize generally the same technology, that is, utilizing and controlling an attachment apparatus, such as a focused energy beam, or a mechanical weed drill, or a collecting apparatus, to accomplish similar tasks but with different results. In an alternative embodiment the attachment apparatus is stationary and the GUR mobile apparatus is adjustable. The first embodiment below is for the adjustable attachment apparatus.

Figure 2:
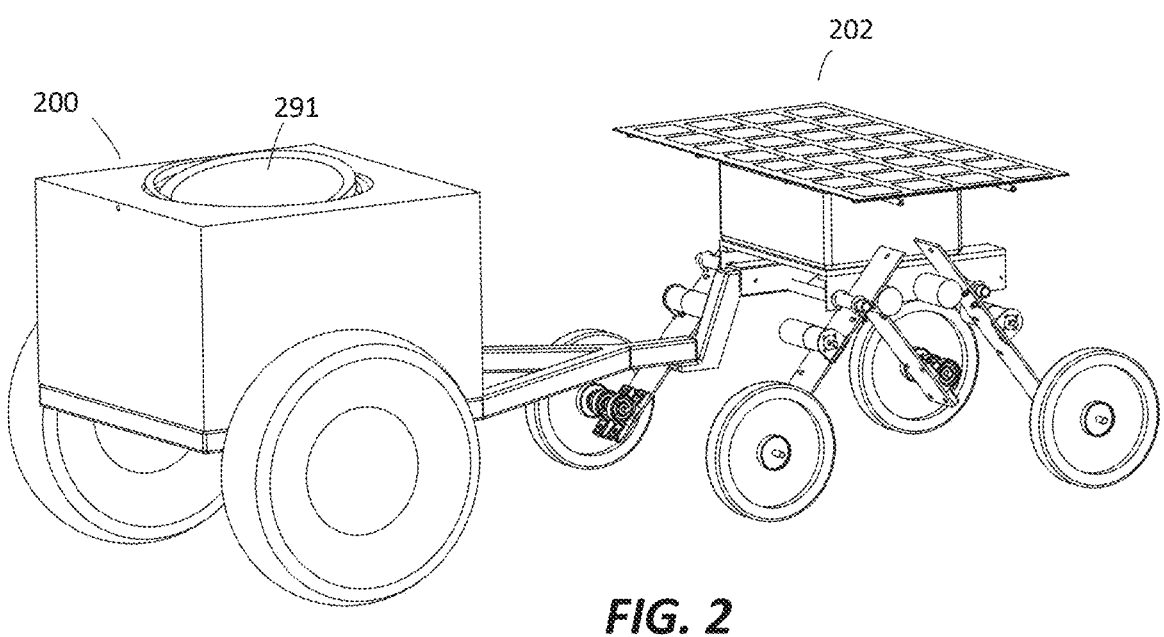
FIG. 2 is perspective view of the GURU of the present invention using a trailer hitch and a trailer hitch attachment.
Figure 3:
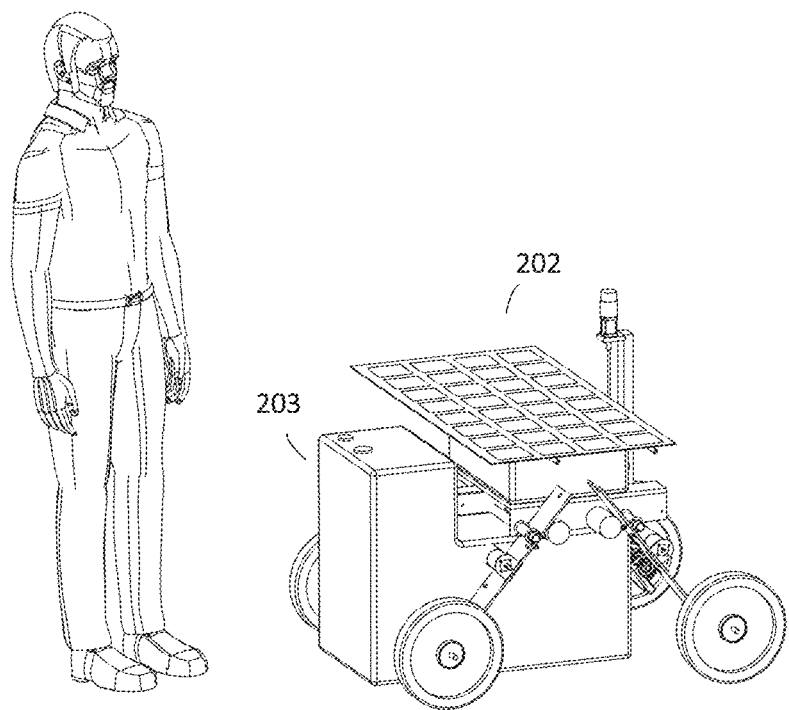
FIG. 3 is a perspective view of a different embodiment of the GURU, a fueling docking station and a user.
Figure 5:
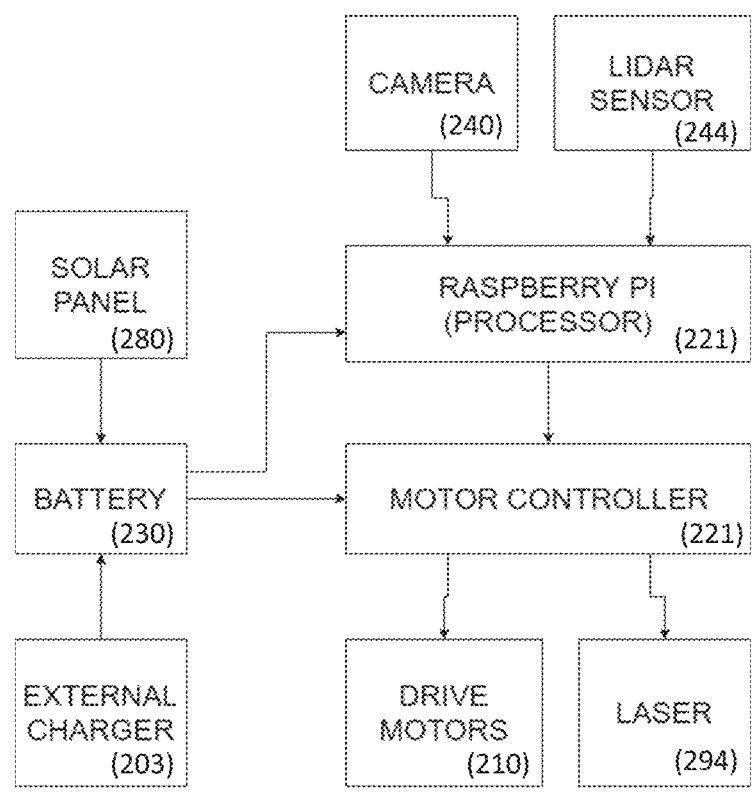
FIG. 5 is a block diagram explaining the GURU.
Figure 8:
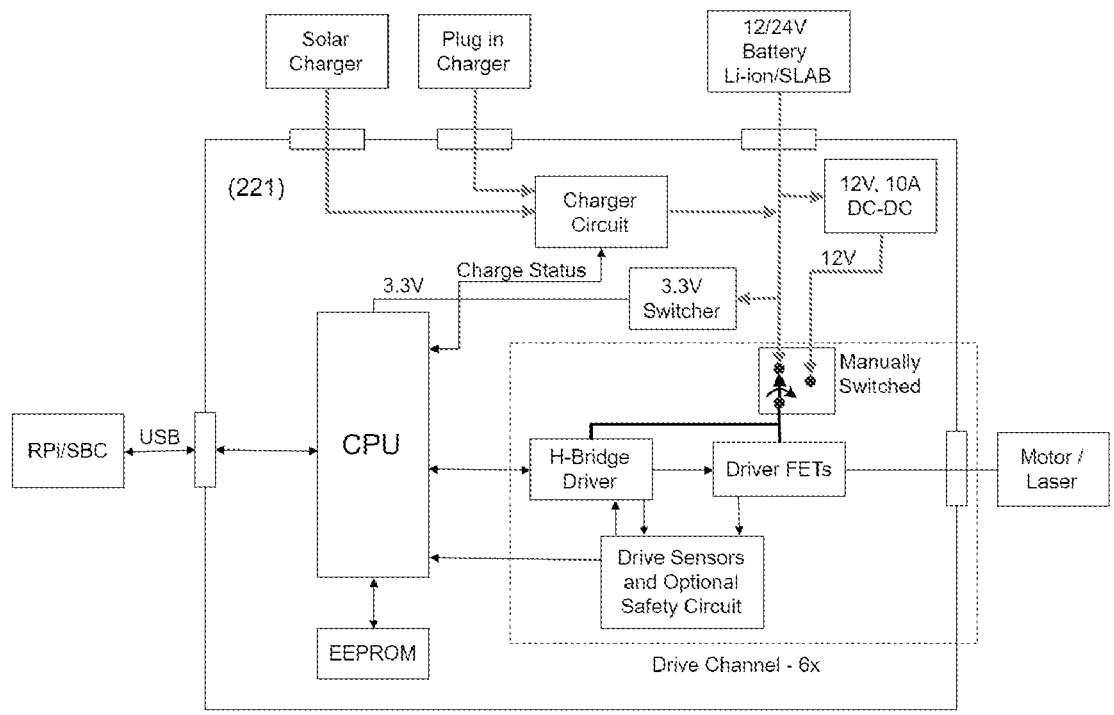
FIG. 8 is flow chart showing GURU operation.

FIG. 5 is a flow chart showing the parts of the next embodiment. As shown in FIG. 1 this embodiment is a configurable ground utility robot GURU 202 having at least the following parts: an all-terrain mobile apparatus 210; a payload accepting apparatus 261; an onboard processor 221, as also shown in the diagram at FIG. 8 and flowchart in FIG. 9; at least one sensor 240 that communicates with said onboard processor 221; at least one energy beam payload device 290 connectable to the payload accepting apparatus 261, capable of creating an energy beam 294 having enough power to elevate an internal temperature of a subject 299 when the energy beam 294 is focused on the subject 299 and where the energy beam payload device 290 communicates with the onboard processor 221. The ground utility robot 202 also has a computer program 220 that at least performs the following functions: receives and interprets data from the at least one sensor 240; controls the mobile apparatus 210; focuses the at least one energy beam 294 on the subject 299; and controls the beam strength and time duration. Furthermore, this configurable ground utility robot 202 has an adjustment apparatus 297, controlled by a computer program 220, that is capable of moving and positioning the at least one energy beam payload device 290. The energy beam is typically one of a variety of beams, including a laser or infra-red beam 295, a lens 291 focused light, as shown in FIG. 2, a microwave beam 293, or a microwave emitter 292. This GURU 202 has an onboard solar array 280, an onboard fuel cell 230. Also, there can be a variety of sensors, including a camera 241, an infrared camera 242, motion sensors 243, Lidar 244 microphones 245, Audible devices 246, LED lights 247, and a GPS system 248. The GURU in this embodiment is used for weeding and the subject in this case is a non-crop or weed. However, it could also be a bug or pest. The configurable ground utility robot of this embodiment can also be used as a crop collecting apparatus, where the subject is a crop stem, and where said energy beam is used to cut the crop stem so that a crop can be placed in the crop collection apparatus 249.

This first Embodiment is a weed suppression system 200 having an energy beam control system that uses the focused energy beam 294. In this embodiment the GURU 202 is capable of negotiating varying terrains, the onboard processor 221 with onboard software 220, the at least one sensor 240 affixed to the mobile apparatus 210 (part of the GURU 202) that communicates with the onboard processor 221, the at least one energy beam payload device 290 capable of creating the energy beam 294 having enough strength to elevate an internal temperature of a subject 299 (in this case, a non-plant) when the energy beam 294 is focused on the subject 299 and where the energy beam payload device 290 communicates with the onboard processor 221, further having an adjustment apparatus 296, or turret or other adjusting device, connected to or part of the at least one energy beam payload device 290 or, in the alternative, connected to or part of the mobile apparatus 210, to position the energy beam payload device 290 so that the energy beam 294 can focus on the subject 299, and the onboard computer program/software 220 that runs the weed suppression system 200 performs at least the following functions: controls the mobile apparatus 210; receives and interprets data from the at least one sensor 240; controls the adjustment apparatus, which might be the robot itself 296 to move and position the at least one energy beam payload device 290 so that the energy beam 294 from the at least one energy beam payload device 290 is focused on the subject 299; and controls the beam strength and a duration of the energy beam.

This weed suppression system 200 could use a tractor or other man-controlled devices to move about the growing area, or territory. However, the preferred means of moving the system around the territory is to use the Ground Utility Robot (GURU) 202 described in detail above. As set out above, this GURU 202 can be used for many different chores, including assistance with weed control, snow removal, moving cargo around, monitoring weather, security, predator control, pest control, harvesting crops, or any of a variety of tasks. In this embodiment the GURU 202 is used in part to move the weed suppression system around the territory. The present invention consists of the software and hardware that identifies the subject, or here, non-crop 299, approaches it in challenging terrain (it can be hillsides or any other terrain) and then uses the energy beam 294 to suppress or destroy the crop. The GURU 202 can be of a variety of forms, such as the insect-like apparatus that uses insect-like locomotion via the insect leg articulation, to focus the energy beams to suppress/destroy the non-crop 260, or it could be the wheeled mobility apparatus as described above, or any other configuration that allows for mobility around the varied terrain.

Specifically, in this embodiment there is an autonomous robot system 1 having at least one autonomous, field deployable robot, or GURU 202, zero or more fueling docking ports 103, software 220 that will allow the GURU 202 to navigate in either a structured or unstructured environment and where the GURU 202 uses the energy beam 294 from the energy beam payload device 290 to remove weeds. The GURU 202 in this embodiment is programmed to identify and discern weeds from crops so as to not destroy all the crops but rather, to destroy only the offending weeds. And more specifically, the system is designed to really only identify the crop. There are hundreds of types of weeds and thus programming and learning all the weeds is difficult and unnecessary. What is really only necessary is to identify the plant that is not be killed, suppressed or inhibited. In this way the system will attack anything that is recognized as non-crop 299 and because of this simplistic solution the software must only recognize crop and non-crop. The GURU 202 of this system uses a focused energy source to eradicate the non-crop 299. In this particular embodiment it should be noted that it is the energy beam payload device 290 that is adjustable. In order for the system to work the energy beam 294 must be focused on the subject non-crop 299. In this configuration the GURU 202 works in conjunction with the energy beam payload device 290 to focus the beam. This is accomplished by the GURU getting in place and the payload device moving to focus on the weed. In a later described embodiment the GURU itself is the adjusting device.

Currently many systems designed to remove or kill weeds use either chemicals to kill or mechanical action to attempt to uproot and remove the weed from the ground. These two current systems are ineffective for several reasons. First, the chemicals can harm the other plants and more importantly they can harm humans who consume the crops. Second, it is not guaranteed that the chemical will actually kill the weed. Third, it is not environmentally friendly to use chemicals for farming. With respect to the mechanical apparatus and weed removal, again, it is not guaranteed that the weed will be removed and killed, and there is a danger that when trying to remove the weed that the crop will mistakenly be removed as well. The present application also utilizes a mechanical weed removal application but contrary to the existing art, uses a different type of weed and plant identification system in order to prevent plant damage. The presently described embodiment, however, uses a non-chemical, non-mechanical means to eradicate weeds.

Figure 4:
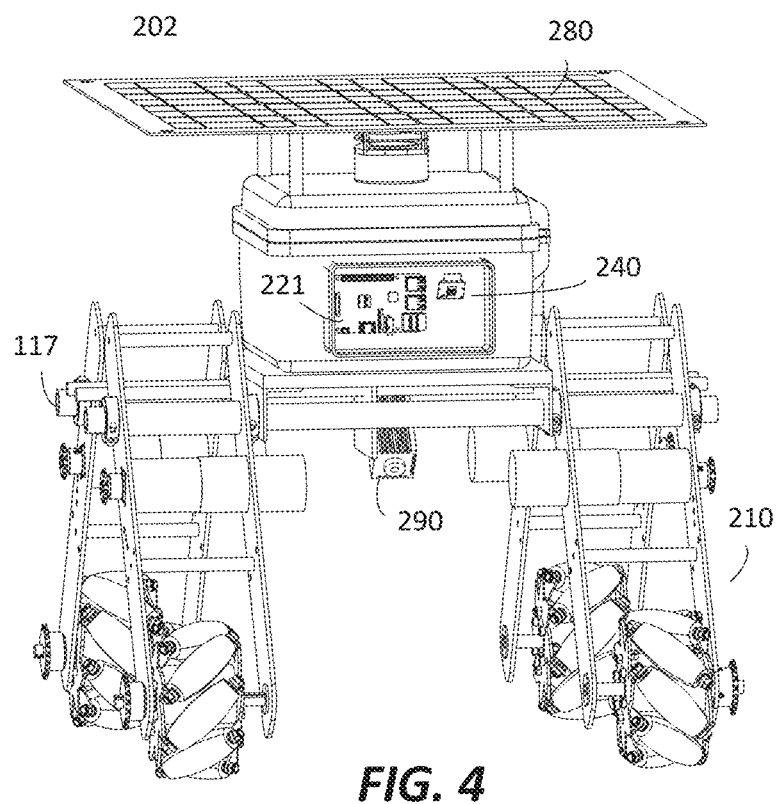
FIG. 4 is a perspective view of a different embodiment of the GURU.

In this second embodiment, as shown in FIG. 4, the GURU 202 itself is configured so that it can move its body to align the focused energy on the non-crop 299. The GURU 202 is nimble enough and has enough ability to position and align its body to focus the energy on the selected non-crop 299. The GURU 202 can be any of a variety of configurations, but two envisioned options are set out herein. One, is the GURU 202 described above having the chassis, electric motors, the mobility apparatus (such as caterpillar tracks or wheels), onboard sensors, electronics, fuel cell, etc. and a means to connect the energy beam payload device 290 to the GURU 202. This device also can include a linkage chassis 116 and pivoted suspension 117. These two particular apparatus, along with other types of adjustable apparatus, allow the GURU 202 to have an adjustable height and a unique configurability. In this configuration there is the configurable ground utility robot 202 having an adjustable all-terrain mobile apparatus 210; an onboard processor 221; at least one sensor 240 that communicates with the onboard processor 221; at least one payload 262 secured to the ground utility robot 202; a computer program 220 that at least performs the following functions: receives and interprets data from the at least one sensor 240; and adjusts movement, height and position of the adjustable all-terrain mobile apparatus based on the data so that said payload can execute a task. In this embodiment the configurable ground utility robot also features the linkage chassis 116 and the pivoted suspension 117 as set out above. This allows the device flexibility and adjustability. Furthermore, in the preferred embodiment the payload is an energy beam 294 and the task is weed or pest suppression. However, it could also be used for harvesting. Ideally, the energy beam is a laser, a lens focused light, an infra-red beam, a microwave beam, or a microwave emitter and this GURU is controlled by the computer program to adjust the GURU so that the GURU is used to position the energy beam payload device. Moreover, it also desirable for the configurable ground utility robot to have an onboard solar array 280 and an onboard fuel cell 230.

Although it is preferable to use the energy beam for weed and pest eradication, it is also possible to use a weed drill 298. In this configuration the payload is the weed drill 298 and the adjustable all-terrain mobile apparatus 210 is controlled by the computer program 220 to position and control the weed drill 298 payload device. The weed drill 298 targets the identified weed and cleanly separates, lifts and removes the weed from the ground.

In yet another configuration, a GURU 223 has an insectoid body featuring a main body or chassis and a variety of legs 122 that allow for mobility over a variety of terrains. The energy powering the energy beam 250 can be from a variety of sources, but it is desired that the energy come from an infra-red source, a laser source 295, a microwave beam 293 from a focused microwave emitter 292, or even from focused sunlight by using a simple optical lens 291 as described above.

When shaped as the field deployed arachnid bodied GURU 223 the GURU 223 ideally carries its electronics and fuel source inside a central body (similar in shape to a spider. The insect-like legs 222 allow the GURU 223 to navigate unstructured, inclined terrain with a minimum foot print and surface contact area, as to not disturb the field. This leg configured also allows the GURU 223 to move its body to focus on the identified non-crop 299 below. One of the other unique aspects of this invention and configurations is that it can operate most anywhere. Many previous adaptations and attempts to create weed killing robots rely on structured field configured. This is not true with the present arachnid bodied GURU 223.

The ultimate goal for autonomous weed removal is to eliminate the use of herbicides. The arachnid autonomous robot GURU 223 of the present invention use the insect like chassis, with between two to six long legs of variable length (6 ft nominal). In the center, the "insect body" can carry batteries and/or solar panels, and on the underside, sensors 240, such as cameras 241 for identification of weeds. In addition, as described above, there can be a microwave focused emitter, or infra-red laser (TBD) that destroys the identified non-crop 299.

As shown in FIG. 2, an alternative to micro wave or laser, for high insolation areas is focused sunlight where a large, simple, optical lens is placed in the center of the robot body that focuses sun rays on the non-crop subject 299, rapidly increasing its temperature and essentially burning/boiling the stem, as close to the ground as feasible.

In application, the GURU 202 having the wheeled mobility apparatus, moves slowly across a geo-fenced target location, able to navigate variable, steep or flat terrain. It ideally can deal with both ordered vegetable rows or unstructured fields of plants (wheat, corn, etc). The GURU 202 operates 24/7, with a duty cycle determined by its ability to recharge (either through solar, or inductive magnetic field charging using the base station). As detailed below, the GURU 202 may also be able to return to a fueling docking port 203 when its charge reaches critical level and these docking stations or fueling ports 203 can be either at a central location or scattered about the service area. Multiple GURU 202s operating on large fields will enable early and often weed removal, preventing weeds taking over in clusters.

From an operational standpoint, the autonomous robot system 1 is designed to be available to everyone, not just the wealthy or large corporate farm companies. The GURU 202s can be leased and rotated between farms using the above described reservations system. This design presents a system to lower income farmers that otherwise could not afford to purchase and use the bats or the system. This system can be used by small to medium sized independent farmers, medium to large farms, and consumer gardens (with smaller scale version), and even now other applications and users are continually emerging.

In this present application the user will employ the described GURU 202 to eliminate weeds. To more specifically define the invention set out above, we now describe the GURU 202 operation when used as the weed suppression system. First, the GURU 202s are reserved by a customer using the above described reservation system, they are then delivered to the customer's site and are placed on a field and are geo-fenced so they know the virtual boundaries of the field using either GPS, visual cues, Wi-Fi beacons or any other type of virtual fencing system. The GURU 202 uses machine vision to identify the non-crop 299, approach it, then tilts its body in such a way that it can focus the direct energy beam 294 from the energy beam payload device 290 that will heat and destroy the subject non-crop 299. The energy beam 294 can be one of many embodiments but below are three specific embodiments that could be utilized for the present application.

First is a focused sun energy using a large (12" or larger) diameter optical lens 291, attached to the GURU 202, that is positioned autonomously by the GURU 202, so the peak energy density is on the stem of the identified non-crop 299. Just a few seconds of intense focused sun energy is enough to heat up and burn the non-crop 299 stem, suppressing its growth significantly. The diameter of the lens 291 could be smaller or larger depending on lens strength, regional sun, or any number of additional variables, but is ideally 12 inches or larger.

A second type of energy beam 294 is a focused microwave emitter 292 that could also be used to heat up the water molecules inside the non-crop 299 (and on its surface) essentially boiling its stem and leaves. The same technology as described above allows us to identify the non-crop's stem and leaves and to then move the GURU 202 so that the microwave beam 293 dispersed from the focused microwave emitter 292 is optimally placed to eradicate or at least slow down the non-crop's growth.

A third energy beam option is an infrared laser beam 295, preferably in the order of 30 W power rating, with a surface area of a few millimeters, again focused on the non-crop stem. Just a few seconds allows the laser 295 beam to burn through the non-crop stem and create holes in the leaves and non-crop body.

Essentially it does not matter what type of energy beam is used to eradicate the non-crop 299, as long as it provides enough energy to destroy the non-crop internally but not enough energy to cause fires.

As mentioned above, a final embodiment would include a mechanical means to eradicate and eliminate weeds. In this embodiment the same GURU 202 is used to align and focus the mechanical apparatus. In this particular embodiment the weed drill 298 is used instead of the focused energy beam. The weed drill 298 attachment is similarly affixed to the GURU 202 as the above described energy beam payload device 290. However, instead of using one of the preferred energy beams 294 (such as the focused energy from the lens 291, or the focused microwave emitter 292, or the microwave beam 293, or laser beam 295) the present application resorts to a more traditional mechanical means. The difference lies in two important elements. First, the present system uses the sophisticated weed recognition software described above in order to minimize the elimination of plant rather than non-plant. And second, the system uses the new, efficient and proficient weed drill 298 as a means to remove offending weeds. In this embodiment the weed is recognized, the GURU 202 positions itself and the weed drill 298 so that the weed drill 298 can be deployed into the soil. The rotating drill then literally pulls the weed from the ground, preventing future growth of the week. Alternatively, a spinning device, similar to a weed wacker, could be used to cut the weed off as close to the ground as possible.

In brief summary, the autonomous robot system has robots, the computer program to run the robots, and potentially refueling ports or charging ports. The robots from this system are sent out into the field in search of the non-crops. Once the robot identifies the non-crop it uses the energy beam that is emitted from the energy device or the mechanical means to eradicate the non-plant. After destroying the non-crop, the robot moves on in search of the next non-crop. This same system can be used for the suppression of pests also, as will be described next.

Pest Bots

The second application for the above described GURU 202 is a pest control system having an energy beam control system that uses a focused energy beam 294. As this system is identical to the system used to eradicate weeds the Figure numbering system remains the same, as do many of the descriptions and parts. In this embodiment there is the GURU 202 having the all-terrain mobile apparatus 210, the onboard processor 221, onboard software 220, at least one sensor 240 affixed to the mobile apparatus 210 that communicates with the onboard processor 221, at least one energy beam payload device 290 capable of creating an energy beam 294 having enough strength to eliminate pests when the energy beam 294 is focused on the pest 310 and where the energy beam payload device 290 communicates with the onboard processor 221, further having a turret, or an adjustment apparatus 296 connected to the at least one energy beam payload device 290 to position the energy beam payload device 290 so that the energy beam 294 can focus on the pest 310, and the computer program, or onboard software 220 that runs the pest control system at least performs the following functions: controls the mobile apparatus 210; receives and interprets data from the at least one sensor 240; controls the adjustment apparatus 296 to move and position the at least one energy beam payload device 290 so that the energy beam 294 from the at least one energy beam payload device 290 is focused on the pest 310; and controls the beam strength and a duration of the energy beam.

This embodiment is identical to the first embodiment except for the application and use of the beam. The all-terrain GURU 202 will behave similarly to that of the weed control GURU 202 but rather than heating up non-crop subject 260 the beam will focus on pest subject 310 in order to eliminate the pest.

Obviously, the software will be different as the GURU 202 will now have to recognize a variety of moving subjects, rather than just non-crops subject 299. This can be accomplished in a couple of ways. First, it could be programmed similar to the non-crop application where the GURU 202 could attack anything "non-human" or "non-mammal." The GURU 202 could utilize the sensors to pick up body temperature and therefore only attack pests that have a body temperature lower than mammals. Alternatively, it could be programmed to actually identify a variety of pests. This could be done through an initial data upload, or an initial data upload combined with learning and possibly combined with the human assisted machine learning, as described above. In any case, the process is basically the same. The device identifies the subject, the energy beam is focused and deployed, and the subject is eradicated.

The GURU 202 could also do double duty by suppressing weeds and controlling pests. The GURU 202 could be programmed to move from crop plant to crop plant, suppressing weeds and by eliminating any pests around the crop using a single energy beam. Or, the GURU 202 could be equipped with multiple energy beams such that one or two beams would perform the weed suppression task while other beams would perform pest control.

In most ways the pest control system is identical to the weed suppression system described above except for the task, i.e., eliminating pests rather than suppressing weeds, so a more detailed description of the system will not be included here.

Harvesting Bots.

Yet another embodiment that utilizes the energy beam 294 is a harvesting system. This embodiment is slightly different than the previous two embodiments in that the controlled energy beam is used to cut produce from the stem and then the collecting apparatus 249 is used to collect the crops. This embodiment features the configurable ground utility robot 202 having the adjustable all-terrain mobile apparatus 210; the collecting apparatus 294; the onboard processor 221; the at least one sensor 240 that communicates with the onboard processor 221; at least one payload secured to said ground utility robot; and a computer program that at least performs the following functions: receives and interprets data from the at least one sensor; adjusts movement, height and position of the adjustable all-terrain mobile apparatus based on the data so that the payload can execute a task. In this case the payload is a crop stem severing device 252 and the task is harvesting. In this application the crop stem severing device 252 utilizes the energy beam 294 to sever the stem and free the crop. Here, the crop is delivered into the collecting apparatus 249 after the crop stem is severed by the severing device. This apparatus provides a clean, efficient means to harvest low lying crops, and possibly high fruit crops as well, such as apples or grapes or other produce. Ideally the GURU 202 can be used for pest and weed control along with harvesting. As noted above, the desire is to have the systems run entirely on renewable energies, so it is also preferable for the system to have an onboard solar array 280 and the onboard fuel cell 230.

The collecting apparatus 294 can be affixed to the GURU or it could be another GURU that either is attached or just follows the first GURU. Also, it could follow behind and collect the produce or it could lead and collect the produce. This embodiment features an energy beam control system having an all-terrain mobile apparatus; an onboard processor; at least one sensor affixed to the mobile apparatus that communicates with the onboard processor; at least one energy beam device capable of creating an energy beam having enough strength to sever a produce stem when the energy beam is focused on the produce stem and where the energy beam device communicates with the onboard processor; an adjustment apparatus connected to the at least one energy beam device to position the energy beam device so that the energy beam can focus enough energy to sever the produce from the stem; a collection apparatus to collect, hold and transport the produce after the produce stem is severed; and a computer program that runs a produce harvesting system and at least performs the following functions: controls the mobile apparatus; receives and interprets data from the at least one sensor; controls the adjustment apparatus to move and position the at least one energy beam device; controls the beam strength and duration so that the energy beam can cut the produce stem; and controls and monitors the collection apparatus.

As noted, this system is somewhat different from the previous two embodiments and is in some ways more difficult in application. This system would utilize the same GURU 202 as the previous embodiments. It would also utilize similar programming to control the energy beam 294 but rather than using the beam 294 to suppress a weed or kill a pest it would be focused on a plant stem for a long enough time to sever the stem in half, thus releasing a crop from the stem. Again, the beam 294 would have to be controlled enough to just cut the stem and not harm the plant or cause fires in the crop field.

In addition to the cutting procedure this embodiment would have a collection apparatus 249 to retrieve the crops once severed and cut from the stem. This system would require some means to collect the crops, i.e., fruits, nuts, etc. and place them in the collection apparatus 249. The programming would be somewhat more complicated as the system is now not just destroying weeds or pests but is working to not injure the crop and then collect the crop after it is separated from the stem.

Autonomous Predator Identification and Conflict Reduction System.

Another embodiment or use for the GUR 202 is as an autonomous predator identification and conflict reduction bot. A side benefit of the 24/7 duty cycle farming robot is the ability to identify predators using the camera and or a thermal infrared camera, a microphone, motion sensors and then using noise, light, odors or other non-lethal means to prevent them from getting close to the geo-fenced area. The GURU 202 could be used for a variety of predator deterrents, including those that could attack the crops, those that could attack other animals on the property, those that could attack humans on the property, or those that are there for other illegal activity, be it trespassing, theft, vandalism, or destruction of property.

In order to deter animals from attacking and eating the crops, there are basically three different types of repellants that can be used. They are odor-based repellants, taste-based repellants and instinctual fear-based repellants. The robots could apply natural, odor and/or taste-based deterrents to the plants through a spray or some other means. This could be done in conjunction with the daily activities of eradicating weeds and pests. In some instances, a repellent product will utilize more than one cause of action. For example, a spray on repellent may have ingredients that produce both a foul odor and also include an ingredient that makes the plant less attractive from the sense of taste. There are many repellants available that are entirely natural and do not use any chemicals whatsoever and these would be the preferred type.

In addition, the bots could also use noise and light, that work well as fear-based repellants. The bots could be programmed to dissuade and prevent predators from entering the controlled area through the use of loud noise, sirens, flashing lights, laser lights, or a combination of these deterrents. These same deterrents could be used on predators that are attacking the plants as those that are there to attack livestock or other animals. Obviously, these would be larger animal breeds. These means could be used to scare aware predators and thus prevent loss of livestock animals, stored crops etc. This gives the user peace of mind knowing that his property is secure and his investment safe.

Aside from animal predators the bots could serve as a security system to prevent prowlers and unauthorized persons from breaching the perimeter. This could be done by using motion detection where if motion is detected, and a person identified, the bot could then send alerts to the owner or the Control Company to either activate alarms, trigger sirens or even call 911. Obviously, the bots could also use lights, lasers, sirens and horns as an initial means of warning and scare tactic. Then, if the bot still senses motion or danger it could alert the Control Company or the Police. In addition, the system could include facial recognition to recognize known users, such as Control Company employees, or the Customer, in order to prevent false alarms or warning.

Weather Station and Soil Testing.

Yet another use for the bots is that of a weather station to monitor and report into the Control Company, local weather stations, governmental agencies, data collection centers, or anyone wanting access to his information, either on a free or paid for basis. A sensor suite already provides key telemetry per robot, and stream processing by remote peers can produce detailed weather/hydrology data available for farming optimizations. Along with reporting weather the robot can compile, store and analyze the collected weather data. This information will provide useful data to the user through weather patterns, rain fall measurements, temperature measurements, humidity measurement, and a variety of other measurements that will assist in successful growing seasons and better crop production. The bot could also take soil samples and perform soil testing as it roams the fields. Samples could provide a variety of information, depending on the type of sensors utilized. Information could include color, compaction, soil moisture content, organic content, pH, profile, structure, temperature and texture, just to name a few. These tests help establish organic matter, erosion factors, aeration, available nitrogen and soil fertility. These tests can determine soil fertility, or the expected growth potential of the soil which indicates nutrient deficiencies, potential toxicities from excessive fertility and inhibitions from the presence of non-essential trace minerals. Labs typically recommend 10-20 sample points for every forty acres of field and they recommend creating a reference map to record the location and quantities of field samples in order to properly interpret test results. Something that used to be done manually can now be done by the GURU 202 with better tracking, sampling and mapping. Testing is also performed on-site using the onboard software and computer. This eliminates the need to remove the soil from its natural ecosystem, thus preventing any chemical changes that might occur during a move. Having sophisticated software and computer systems in the field removes the need for "do-it-yourself" testing kits and provides a much more robust and thorough analysis. If the bots are working adjacent fields it would also be helpful to compare the soils in the region. The testing is included with or could be purchased in addition to the standard tasks assigned to the bots.

AI Learning.

The GURU 202 ideally will be connected online and will have learning ability so that it can continually learn, using connection with online software, supplied by a centralized control center or System Manager (such a cloud computing cluster of computing nodes), and also improve overall performance through machine learning and crowdsourcing, between all deployed robots, of all weed suppression images and actions, pest data, predator data and weather data. The GURU 202 uploads images of all plants, animals, predators, weather conditions, soil conditions, soil tests, and environments it experiences, along with its actions. A machine learning platform processes continuously the inputs (sensor data) and outputs (robot actions) and using reinforcement learning it adapts the parameters used by all GURU 202s, used to identify plants, pests, move, control the robot's actions, etc. This is essentially a feedback control system that uses data from all the active robots and closes the loop by adjusting configuration parameters, and code, on all the robots. Additionally, the robots self-update when new parameters or code is available.

Energy Supply.

Ideally, the bots will run entirely off the on-board solar arrays. However, it is envisioned that they could be powered from a variety of sources. Ideally however, they will be entirely free of the grid and will work off renewable energy sources at their location. This can be accomplished through a variety of sources and methods, the full chain of energy capture, storage, distribution, and use in mobile robots is described next. The energy source for the robots could come from a singular source or it could be a combination of a variety of sources. These could include solar, wind, hydro, thermal, regenerative breaking, but this system could also feature a hydrogen or methane economy that provides a net positive benefit to the environment and its users. To achieve this lofty goal of independence the system must be able to capture enough energy to keep the robots operational and to keep the entire system operational. This can be accomplished through a variety of energy capture systems that include but are not limited to the following.

Solar.

As shown, each customer deploying one or more robots is offered a fueling port 3 equipped with properly sized solar panels 80 and possibly a battery 5 within the fueling port 3 to store excess power that can then be sold back to the grid or to use when solar generation is not available. The solar array 80 solar panels ideally are flexible panels at least 2 W minimum. If possible, the station is grid to offer net metering benefits. The battery 5 is present to provide buffering of energy during low insolation intervals. It is entirely possible that the robots could be free of charge or at reduced service rates in exchange for the control company's ability to sell back power to the grid. This is beneficial to both parties.

The bots can autonomously recharge by returning to the fueling port 3. The fueling port 3 is equipped with a square weather/water proof floor mat, placed over a level surface. Ideally the mat is approximately 24"×24", depending on the size of the robot. The mat is an inductive charging port 70 and contains an inside transmitter coil used for inductive charging. Each robot has an inductive charging plate 71 that has another coil (receiving antenna) on its underside, that when positioned above the charging port 70 enables wireless charging. The minimum distance required between the robot underside and the floor mat is approximately 12" but this may change as technology advances. Dimensions and specifications will be determined as costs and physical constraints are considered.

Methane

Another alternative, or additional source of energy, is methane. Methane capture and use provides a unique opportunity. Methane is produced by different processes at farm environments. For example, enteric production in all animals, fore stomach production in ruminants, and general decay processes of organic waste (farm waste or animal waste) are some of the available sources of methane, just to mention a few. The control company can offer the opportunity to all sites with methane product, to capture and use the product for their own robots and additionally, to sell the methane to other users, including other control company robot owners or leasing customers.

When using methane to recharge the bots it is ideal for each bot to have its own compact fuel cell 6 that converts the methane to electric power to drive the bot. The compact fuel cell is tuned to methane fuel as hydrogen source. It is a hybrid energy source (fuel cell+Li-Ion battery kept warm by the fuel cell heat byproduct). Bots featuring and using the fueling port 3 have an autonomous navigation and docking system that guides each bot to the fueling port 3 for refueling. There are many different ways to achieve this, including an autonomous navigation software solution that identifies the fueling port 3 using visual cues that are part of the station itself. The operator has the ability to teach the robot the location of the fueling port 3, through a "home tour" approach, so the robot can localize and navigate to the station. In addition to visual cues, a wireless emitter can also be used, so the robot can identify and approach the fueling port 3 with precision, even in inclement weather.

The mechanism of refueling will obviously depend on the type of fuel used. If there is electricity present, such as from the grid or a solar panel 80 supplied power to the inductive charging port 70 then the induction charging system could be utilized. However, as described above, methane could be used, or it could even be a combination of both electricity and methane. When using the charging port 3 bots have an alert system that notifies the bot that it is low on fuel and that it needs to go back and refuel. The bots could also use regenerative braking to provide additional charge while in use.

If methane is used then the control company will provide controls and services in addition to those listed above. These services include but are not limited to offering equipment to capture and store the methane. This equipment could be sold outright to the customer or the control company could lease the equipment to the customer. Also, the control company could provide transportation on site or to off-site locations for stored methane when capacity is reached. Methane delivery could also be a provided service where the control company delivers methane to other customers that use methane fuel powered robots and devices. In many of these situations both parties benefit.

There are some drawbacks that need to be overcome but with continued investment and technology advancement these constraints will be removed. However, at present there are obstacles to overcome, specifically, cost, duty cycle duration, life cycle and the maintenance interval.

While the present disclosure has been described as having certain designs, the various disclosed embodiments may be further modified within the scope of the disclosure. This application is therefore intended to cover any variations, uses, or adaptations of the disclosed embodiments using its general principles. Further, this application is intended to cover such departures from the present disclosure as come within known or customary practice in the relevant art.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference, Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

PARTS LISTING

1. AUTONOMOUS ROBOT SYSTEM
2. GURU
3. FUELING PORT
4. FUELING PORT CONNECTORS
5. REFUELING PORT BATTERY
10. MOBILITY APPARATUS
11. CHASSIS
18. TRAILER HITCH
19. ATTACHMENTS FOR HITCH
20. COMPUTER PROGRAM OR SOFTWARE
30. RECHARGEABLE BATTERY
40. ONBOARD SENSORS
50. ONBOARD ELECTRONICS
51. ELECTRONICS ENCLOSURE
60. PAYLOAD RECEIVING SYSTEM
61. PAYLOAD RECEIVING APPARATUS
62. PAYLOAD
63. ENERGY BEAM CONTROL SYSTEM
70. INDUCTIVE CHARGING PORT
71. INDUCTIVE CHARGING PLATE
80. SOLAR ARRAY
102. GURU
103. FUELING PORT
104. FUELING PORT CONNECTORS
105. FUELING PORT BATTERY
110. MOBILITY APPARATUS
111. CHASSIS
112. TWO MOTORS
113. SPROCKETS
114. CHAIN
115. TRACKS
116. LINKAGE CHASSIS
117. PIVOTED SUSPENSION
118. TRAILER HITCH
119. ATTACHMENTS FOR TRAILER HITCH
120. ONBOARD SOFTWARE
121. ONBOARD PROCESSOR
122. LEGS
123. FLAT FREE TIRES
124. INSECTOID
130. RECHARGEABLE BATTERY OR ONBOARD FUEL CELL
140. ONBOARD SENSORS
141. CAMERA
142. INFRARED CAMERA
143. MOTION SENSOR
144. LIDAR
145. MICROPHONE
146. AUDIBLE DEVICE, SIREN, ETC.
147. LED LIGHTS OR OTHER LIGHTS
148. GPS SYSTEM
150. ONBOARD ELECTRONICS
151. ELECTRONICS ENCLOSURE
160. PAYLOAD RECEIVING SYSTEM
162. PAYLOADS
163. ENERGY BEAM CONTROL SYSTEM PAYLOAD
170. INDUCTIVE CHARGING PORT
171. INDUCTIVE CHARGING PLATE
180. ONBOARD SOLAR ARRAY
181. ON-SITE SOLAR ARRAY
200. WEED AND PEST SUPPRESSION SYSTEM
202. GURU
203. FUELING PORT
210. MOBILE APPARATUS
220. ONBOARD SOFTWARE OR COMPUTER PROGRAM
221. ONBOARD PROCESSOR
230. ONBOARD FUEL CELL
240. SENSORS
241. CAMERA
242. INFRARED CAMERA
243. MOTION SENSOR
244. LIDAR
245. MICROPHONE
246. AUDIBLE DEVICE, SIREN, ETC.
247. LED LIGHTS OR OTHER LIGHTS
248. GPS SYSTEM
249. CROP COLLECTION APPARATUS
250. ONBOARD ELECTRONICS
251. ELECTRONICS ENCLOSURE
252. CROP STEM SEVERING DEVICE
260. PAYLOAD RECEIVING SYSTEM
261. PAYLOAD ACCEPTING APPARATUS
262. PAYLOAD
280. ONBOARD SOLAR ARRAY
290. ENERGY BEAM PAYLOAD DEVICE
291. LENS
292. FOCUSED MICROWAVE EMITTER
293. MICROWAVE BEAM
294. ENERGY BEAM
295. LASER BEAM or INFRA-RED BEAM
296. ENERGY BEAM ADJUSTING DEVICE, OR TURRET
298. WEED DRILL
299. SUBJECT
300. PEST CONTROL SYSTEM
302. GURU
310. PEST
320. ONBOARD SOFTWARE
400. HARVESTING SYSTEM
402. GURU
500. SNOW REMOVAL APPARATUS
502. GURU
503. FUELING PORT

505. SYSTEM RECHARGING BATTERY
506. CUSTOM BLADE
510. BLADE
520. ORIFICE
530. SYSTEM RECHARGING BATTERY/FUEL CELL
531. FUNNEL CHANNEL
540. MELTING AREA
550. HEATING ELEMENT
551. PUMP
560. SNOW REMOVAL GEAR
570. SPRAYING APPARATUS
596. Custom snow plow blade
580. ONBOARD SOLAR ARRAY
581. ON-SITE SOLAR ARRAY
582. INDUCTIVE CHARGE PLATE
583. INDUCTIVE CHARGING BASE
590. METHANE FUEL CELL
591. PIPES
592. HOT WATER
593. WATER COLLECTION BASIN
597. METHANE SNOW BLADE
598. METHANE SPRAY PIPES
599. METHANE SPRAY PUMPS
600. Human assisted machine learning system
601. Physical Marker
602. Feature detector software
603. Human
604. Subject
605. Camera
606. Camera Image
607. Image processing algorithm
608. Visual signature
609. Final Image
700. RESERVATION SYSTEM
701. CONTROL COMPANY

The invention claimed is:

1. A configurable ground utility robot comprising:
an all-terrain autonomous mobile apparatus, capable of navigation in both structured and unstructured environments;
a payload accepting apparatus;
an onboard processor;
at least one sensor that communicates with said onboard processor;
at least one energy beam payload device connectable to said payload accepting apparatus, capable of creating an energy beam having enough power to elevate an internal temperature of an object when said energy beam is focused on said object and where said energy beam payload device communicates with said onboard processor; and
a computer program that at least performs the following functions:
receives and interprets data from said at least one sensor;
controls said mobile apparatus;
focuses said at least one energy beam on said object;
controls said beam strength and time duration
an onboard solar array;
an onboard fuel cell; and
where said solar array and said fuel cell provide 100 percent of required power to said ground utility robot.

2. The configurable ground utility robot of claim 1 further having an adjustment apparatus, controlled by said computer program, that is capable of moving and positioning said at least one energy beam payload device.

3. The configurable ground utility robot of claim 2 wherein the energy beam is a laser, a lens focused light, an infra-red beam, a microwave beam, or a microwave emitter.

4. The configurable ground utility robot of claim 1 where said onboard fuel cell is at least one battery.

5. The configurable ground utility robot of claim 4 wherein said at least one sensor is a camera.

6. The configurable ground utility robot of claim 5 wherein said object is a non-crop.

7. The configurable ground utility robot of claim 5 wherein said object is a pest.

8. The configurable ground utility robot of claim 2 further comprising a crop collecting apparatus, where said object is a crop stem, and where said energy beam is used to cut said crop stem so that a crop can be placed in a crop collection apparatus.

9. A configurable ground utility robot comprising:
an autonomous adjustable all-terrain mobile apparatus, capable of navigation in both structured or unstructured environments;
an onboard processor;
at least one sensor that communicates with said onboard processor;
at least one payload secured to said ground utility robot;
a computer program that at least performs the following functions:
receives and interprets data from said at least one sensor;
adjusts movement, height and position of said adjustable all-terrain mobile apparatus based on said data so that said payload can execute a task;
an onboard solar array;
an onboard fuel cell; and
where said solar array and said onboard fuel cell provide 100 percent of required power for said all-terrain mobile apparatus.

10. The configurable ground utility robot of claim 9 where said adjustable all-terrain mobile apparatus further comprises:
a linkage chassis; and
a pivoted suspension.

11. The configurable ground utility robot of claim 10 where:
said payload is an energy beam; and
where said task is weed or pest suppression.

12. The configurable ground utility robot of claim 11 wherein the energy beam is a laser, a lens focused light, an infra-red beam, a microwave beam, or a microwave emitter.

13. The configurable ground utility robot of claim 12 where said adjustable all-terrain mobile apparatus is controlled by said computer program to position said energy beam payload device.

14. The configurable ground utility robot of claim 10 where said at least one payload is a weed drill payload device and where said adjustable all-terrain mobile apparatus is controlled by said computer program to position and control said weed drill payload device.

15. A configurable ground utility robot comprising:
an autonomous all-terrain mobile apparatus, capable of navigation in both structured and unstructured environments;
a collecting apparatus;
an onboard processor;
at least one sensor that communicates with said onboard processor;
at least one payload secured to said ground utility robot;

a computer program that at least performs the following functions:
receives and interprets data from said at least one sensor;
adjusts movement, height and position of said adjustable all-terrain mobile apparatus based on said data;
said payload executes a task;
an onboard solar array;
an onboard fuel cell; and
where said solar array and said onboard fuel cell provide 100 percent of required power for said all-terrain mobile apparatus.

16. The configurable ground utility robot of claim 15 where said payload is a crop stem severing device and said task is harvesting.

17. The configurable ground utility robot of claim 16 where a crop is delivered into said collecting apparatus after said crop stem is severed by said severing device.

\* \* \* \* \*